United States Patent
Taylor et al.

(10) Patent No.: US 11,684,852 B2
(45) Date of Patent: Jun. 27, 2023

(54) CREATE AND REMASTER COMPUTER SIMULATION SKYBOXES

(71) Applicant: Sony Interactive Entertainment Inc., Tokyo (JP)

(72) Inventors: Michael Taylor, San Mateo, CA (US); Sudha Krishnamurthy, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 71 days.

(21) Appl. No.: 17/307,803

(22) Filed: May 4, 2021

(65) Prior Publication Data
US 2022/0355199 A1 Nov. 10, 2022

(51) Int. Cl.
*A63F 13/22* (2014.01)
*A63F 13/525* (2014.01)

(52) U.S. Cl.
CPC .................................. *A63F 13/525* (2014.09)

(58) Field of Classification Search
CPC .......... A63F 13/22; A63F 13/25; A63F 13/30; A63F 13/327; A63F 13/33; A63F 13/332; A63F 13/335; A63F 13/35; A63F 13/40; A63F 13/50; A63F 13/52; A63F 13/525; A63F 13/53; A63F 13/5378; A63F 13/55; A63F 13/56; A63F 13/57; A63F 13/60; A63F 13/67; A63F 13/70
See application file for complete search history.

(56) References Cited

U.S. PATENT DOCUMENTS

| | | |
|---|---|---|
| 2007/0218966 A1 | 9/2007 | Tilston et al. |
| 2015/0206335 A1* | 7/2015 | Hugel .................... A63F 13/25 345/419 |
| 2016/0332074 A1* | 11/2016 | Marr ..................... A63F 13/60 |
| 2018/0136814 A1 | 5/2018 | Parekkadan et al. |
| 2018/0144555 A1 | 5/2018 | Ford et al. |
| 2018/0329480 A1* | 11/2018 | Schwartz ............... A63F 13/27 |
| 2019/0160376 A1* | 5/2019 | Ito ......................... A63F 13/814 |
| 2020/0160534 A1 | 5/2020 | Labbe et al. |
| 2021/0117071 A1 | 4/2021 | Gharpuray |
| 2021/0178274 A1* | 6/2021 | St-Pierre ............... G06K 9/627 |
| 2021/0304468 A1* | 9/2021 | Doggett .............. G11B 27/031 |

OTHER PUBLICATIONS

"International Search Report and Written Opinion", dated Sep. 16, 2022, from the counterpart PCT application PCT/US22/27155.

* cited by examiner

Primary Examiner — Omkar A Deodhar
(74) Attorney, Agent, or Firm — John L. Rogitz

(57) ABSTRACT

A character in a game world of a computer simulation is identified as moving toward a sky box in the simulation. The computer simulation does not permit simulation characters to enter the sky box. Techniques are described for remastering the skybox based on various parameters.

20 Claims, 7 Drawing Sheets

Train GAN

CREATE AND REMASTER COMPUTER SIMULATION SKYBOXES

FIELD

The present application relates to technically inventive, non-routine solutions that are necessarily rooted in computer technology and that produce concrete technical improvements.

BACKGROUND

As understood herein, commonly used computer game assets such as sky boxes are used to increase the visible appeal of computer games.

SUMMARY

Present principles are directed to automatically improving the generation and use of commonly used game assets such as sky boxes, to improving the quality of new indie-style games by improving the quality of commonly needed assets, and remastering old games by artists or automatically upscaling assets in old games on modern hardware.

Accordingly, a method includes identifying at least one sky box in a computer simulation that includes at least the sky box and a game world. The computer simulation does not permit simulation characters from entering the sky box. The method includes remastering the sky box with augmented visuals and/or augmented audio.

In some embodiments, the remastering includes augmenting the sky box at least in part based on at least one image on the game world, and/or based on action in the game world, and/or based on community activity associated with the computer simulation. The remastering may be executed at least in part using at least one neural network.

In example implementations, augmenting the sky box includes changing at least one object in the skybox, and/or changing at least one color in the sky box, and/or changing at least one texture in the sky box, and/or changing at least one audio associated with the sky box.

In another aspect, a device includes at least one computer storage that is not a transitory signal and that in turn includes instructions executable by at least one processor to identify at least one feature in a game world of a computer simulation and execute at least one neural network to generate at least one feature of a sky box of the computer simulation based at least in part on the feature in the game world.

In another aspect, an assembly includes at least one processor programmed with instructions to identify information from at least a first computer simulation or a first level of a second computer simulation, and based at least in part on the information, alter at least one feature of a skybox in a second level of the second computer simulation.

The details of the present application, both as to its structure and operation, can best be understood in reference to the accompanying drawings, in which like reference numerals refer to like parts, and in which:

DETAILED DESCRIPTION

Figure 1:
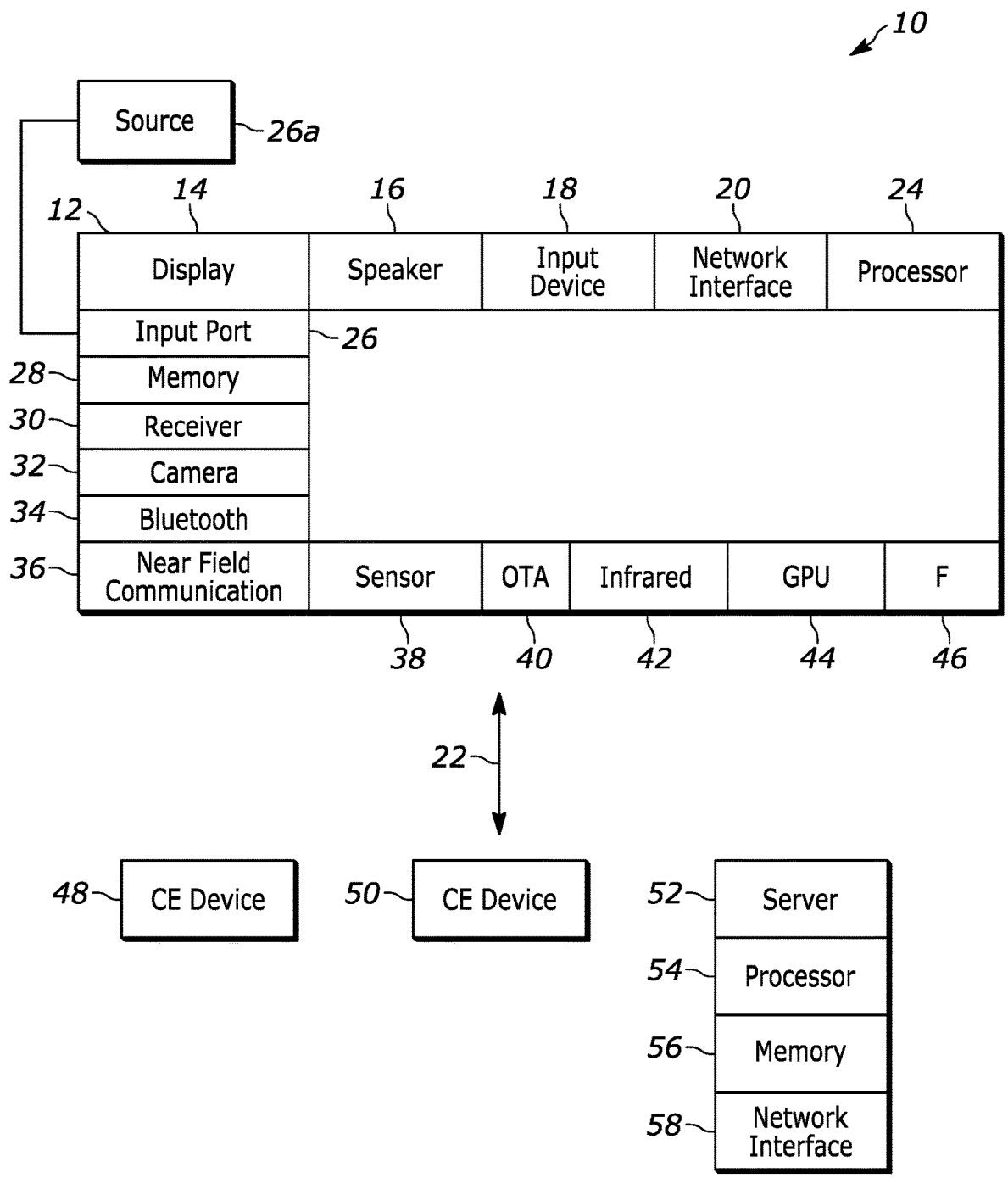
FIG. 1 is a block diagram of an example system including an example in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimensions.

Continuing the description of the AVD 12, in some embodiments the AVD 12 may include one or more cameras 32 that may be a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1.

Figure 2:
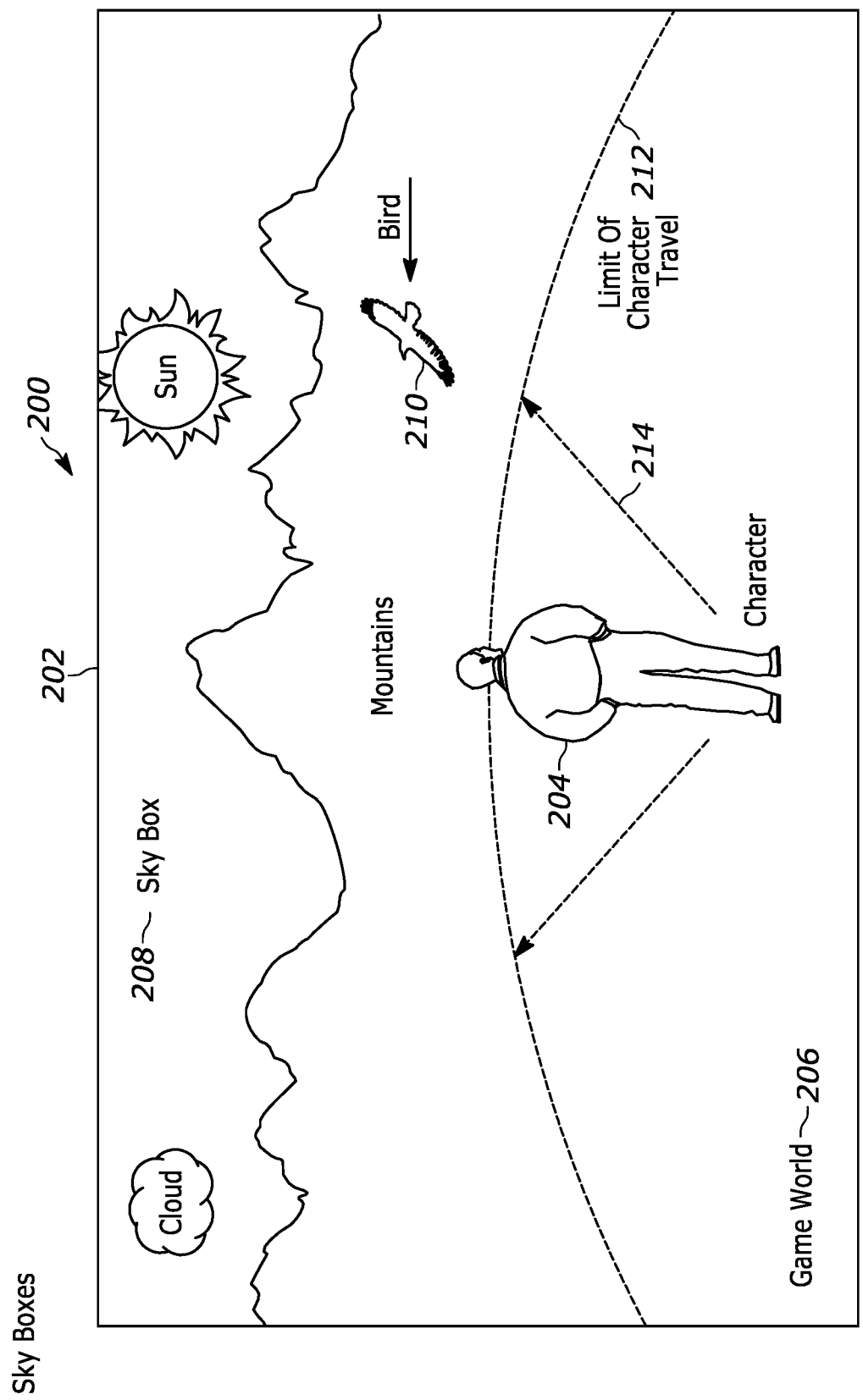
FIG. 2 illustrates an example screen shot of a game space and attendant sky box.
Figure 3:
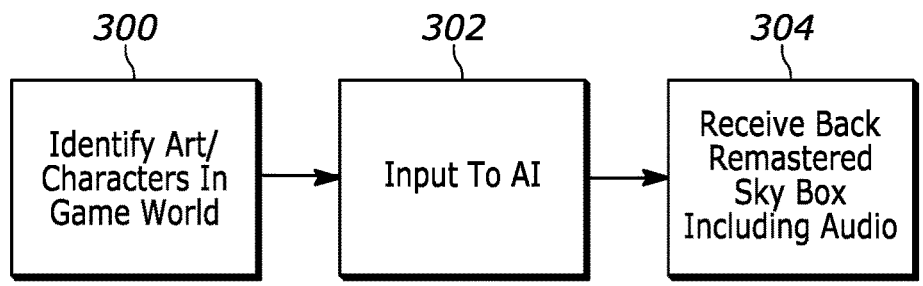
FIGS. 3-6 illustrate example logic in example flow chart format for various techniques for creating a sky box.

FIG. 2 illustrates further. A computer simulation in the form of a computer game 200 is shown being presented in audio-video format on a display 202 such as any display herein. The game 200 typically includes one or more animated characters 204 that move through a game world 206. The game world 206 is implemented as computer space through which characters and other objects can move under control of computer game signals input by a player using a computer game controller and in accordance with a physics engine that defines how objects fall when dropped, etc.

The game 200 may include a sky box 208 that illustrates objects meant to be distant from the arena of the game world 206. The sky box 208 can be a 3D asset that is filled in with background terrain and objects by a generative model such as a generative adversarial network (GAN) according to principles set forth herein.

With more particularity, objects 210 such as distant planes or birds or mountains may be presented in the sky box 208, but the objects in the sky box typically do not respond to control signals from the controller being operated by the player, although they may react to something the player controls a character 204 to perform. Typically, while the character 204 in the game world 206 can move through the game world 206, the character 204 is constrained by the boundary 212 between the game world 206 and sky box 208, such that the game software allows the character to approach the boundary 212 as indicated by the arrows 214, but not cross over into the sky box 208. This limitation may be implemented in the game software and/or enforced by configuring the physics engine to prevent characters from crossing into the sky box.

With this in mind, one aspect considered herein is the reuse and remastering of sky boxes to streamline computer game design. Remastering may be done for existing title to render it more interesting for a newer game console than originally designed for, as well as to provide new feature development using, for instance super-resolution.

FIGS. 3-6 illustrate further aspects. Commencing at block 300 in FIG. 3, art and/or characters (including character "physical" attributes and character activity) in the game world 206 are identified. This may be done on the fly as the designer is creating the computer game or as an end user player is playing the game. For example, input of a character may trigger a daemon to collect information about the character automatically and provide it to an artificial intelligence (AI) engine such as one or more neural networks at block 302.

The AI engine is trained, e.g., using an annotated training set that can include real world video, to generate sky box features such as sky box objects, colors, sky textures, background terrain, etc. based on game world characters and/or game world art. The remastered or augmented sky box is returned at block 304 along with audio that similarly may be generated using an AI engine based on the characters/art in the game world, for consolidation with the computer game. Thus, the AI engine may be trained to learn correlations between sound and background, such as to associate waterfall sound with a visual depiction of a fall, associate tweet sounds with visual representations of birds, etc. In this way audio can be correlated to the visual sky box augmentations and moreover audio can be used in reverse, as input to generate visual background for the sky box.

The AI engine can be trained to generate sky box features to help understand what is in the main game in the game world. This may include meta-messaging that may be generated on the fly as the game is played and presented in the sky box. For instance, if a friend of the player's character in the computer game dies, the sky box can be changed from a sunny day to a gloomy day. Sky box features thus may be established based on game action as well as static characteristics of game characters and may be tied in theme or tone to the game action and characters.

Figure 4:
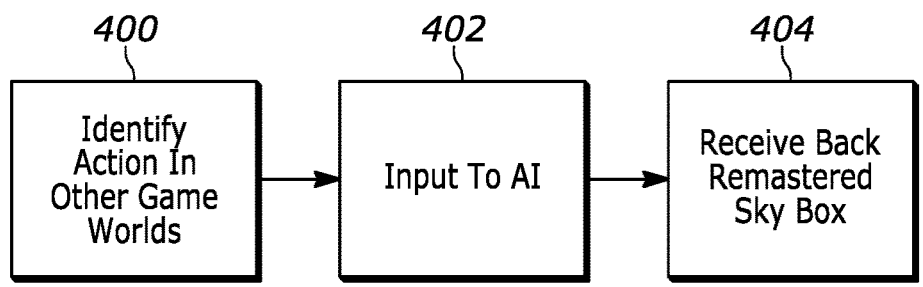

FIG. 4 illustrates that action from another game or another level in the same game world or another part of the same game world than is depicted onscreen currently can be used to establish sky box features. For example, a boss fight in a different part of the currently depicted game world that is being presented on another display under control of a different game engine or the same game engine as controls the sky box under augmentation may precipitate changes in the sky box being augmented, such as, for instance, presentation of a small, distant rendering of the boss fight in the sky box being augmented.

Accordingly, such information from different games or levels or areas of the game world is received at block 400 and provided to an AI engine at block 402.

The AI engine is trained, e.g., using an annotated training set, to generate sky box features such as sky box objects, colors, sky textures, background terrain, etc. based on action from another game or another level in the same game world or another part of the same game world than is depicted onscreen currently. The remastered or augmented sky box is returned at block 404 along with audio that similarly may be generated using an AI engine based on the same variables for consolidation with the computer game.

Figure 5:
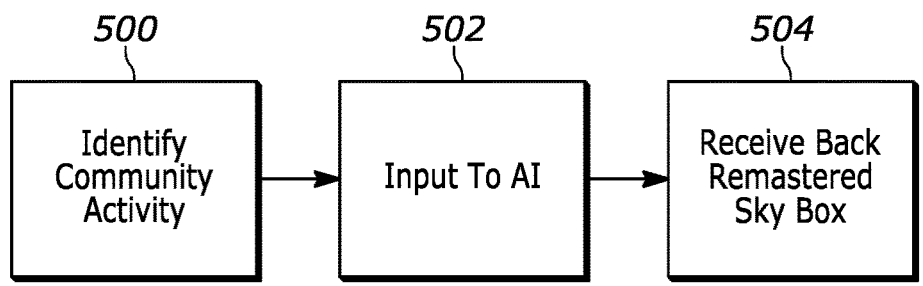

FIG. 5 illustrates that community activity can be used to establish sky box features. For example, a large number of spectators of a computer game as detected by online presence sensing or other means may result in bright sun shining in the sky box, or crowd noises to be emanate from the sky box.

Accordingly, such community activity information is received at block 500 and provided to an AI engine at block 502.

The AI engine is trained, e.g., using an annotated training set, to generate sky box features such as sky box objects, colors, sky textures, background terrain, etc. based on community activity information. The remastered or augmented sky box is returned at block 504 along with audio that similarly may be generated using an AI engine based on the same variables for consolidation with the computer game.

Figure 6:
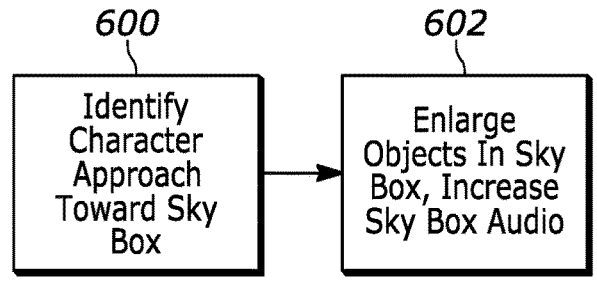

Note that activity in the sky box may become more dynamic as the player's character for instance gets closer to the sky box boundary in the game (like approaching mountains) at block 600 in FIG. 6. For instance, birds or other objects depicted in the sky box can be animated to grow larger and louder at block 602 responsive to identifying that the character approaches the sky box. Similarly, responsive to the character moving away from the sky box, images in the sky box can be reduced in size and the volume of audio associated with the images can be reduced.

Figure 7:
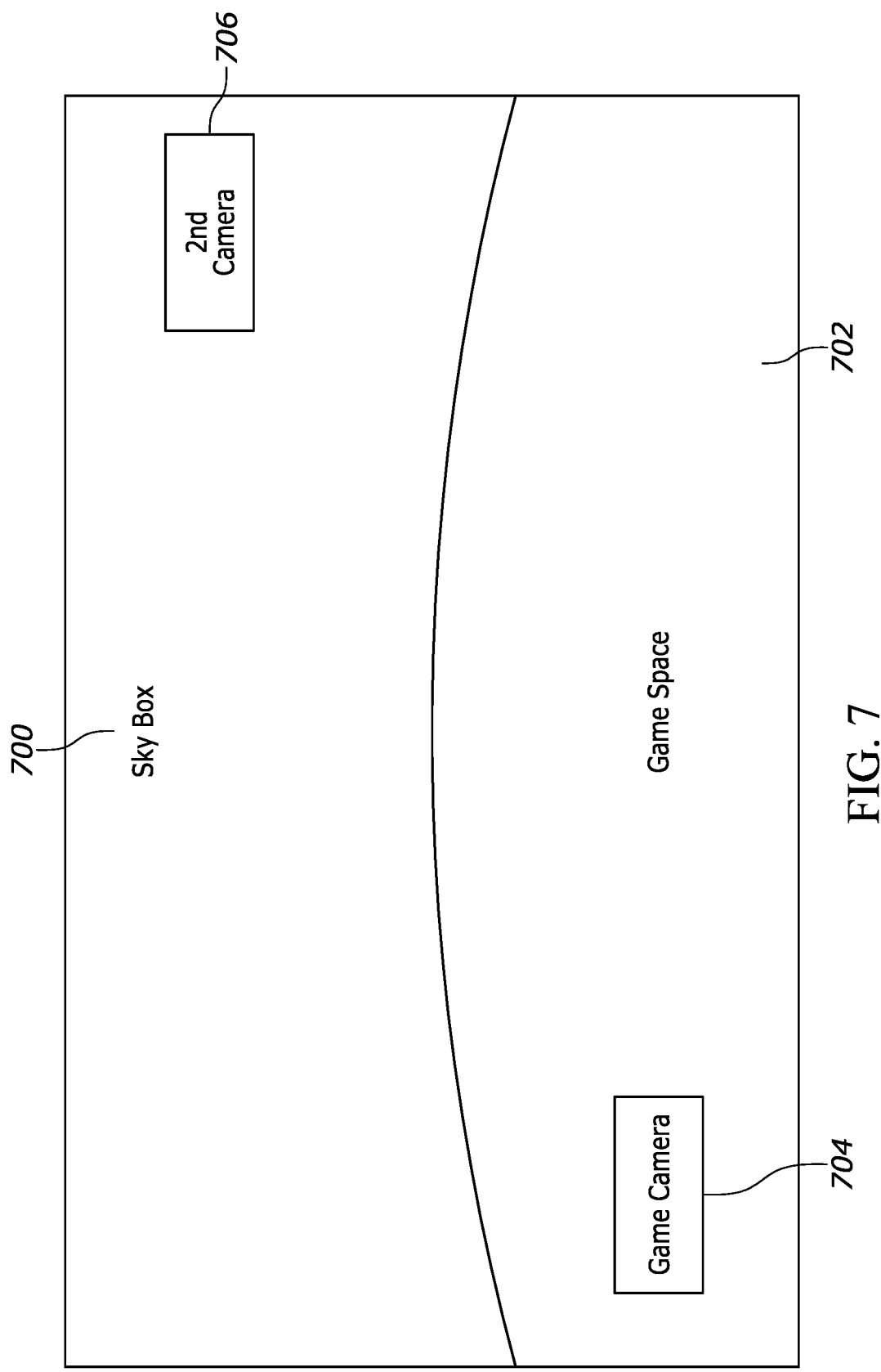
FIG. 7 illustrates a virtual camera placement for a dynamic sky box.

FIGS. 7-12 illustrate further principles attendant to the above. In FIG. 7, a sky box 700 is presented with a game space or world 702 on, e.g., a computer display. Typically, the view the player of a computer simulation has of the game world is from the perspective of a virtual camera 704, which may be the location of the eyes of the player's character in the simulation. As shown in FIG. 7, a second virtual camera 706 may be positioned at a location intended to be the origin of a view of the sky box. The second camera 706 is placed in another spot from the game camera 704 in a level with miniature geometry around it. The second camera 706 renders to a texture which is displayed as the skybox, and the second camera 706 moves in synchronization with the player, so the player sees the geometry of the sky box moving around him.

Figure 8:
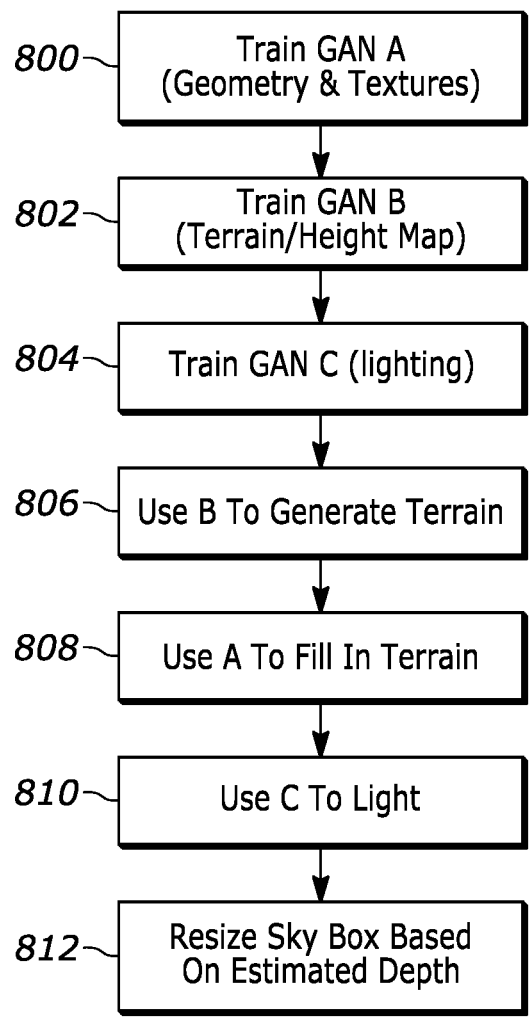
FIG. 8 illustrates example logic in example flow chart format for using GANs to render a sky box.

FIG. 8 illustrates a technique to merge a computer simulation 2D sky box with a game world. Commencing at block 800, a machine learning (ML) model such as a first conditional generative adversarial network (GAN, labeled "GAN A" in the figure) is trained on level geometry and textures to generate comparable assets distributed in a similar manner in 3D space. Similarly, at block 802 a ML model such as a second conditional GAN (labeled "GAN B" in the figure) is trained to generate a textured 3D terrain (height map) using real world data similar to either the sky box skyline texture, or to a real-world reference. Block 804 indicates that a ML model such as a third conditional GAN (labeled "GAN C" in the figure) is trained based on level lighting and 2D skybox lighting to apply dynamic lighting to 3D skybox terrain.

The training may be supervised, semi-supervised, or unsupervised, using a training set of terrains, textures, etc. that may be annotated or that may not be annotated.

Referring to block 806, after training GAN B is used to generate a smooth textured terrain extending from level edge to sky box. Then, at block 808 GAN A is used to fill in the generated terrain with textured 3D assets and at block 810 GAN C is used to apply lighting to assets/characters based on their respective locations in the 3D sky box. Block 812 indicated that the sky box geometry is resized larger or smaller based on the estimated depth (or configured distance) from the virtual location of the player (such as the location in the game world of the character of the player) for use as a dynamic skybox.

Figure 9:
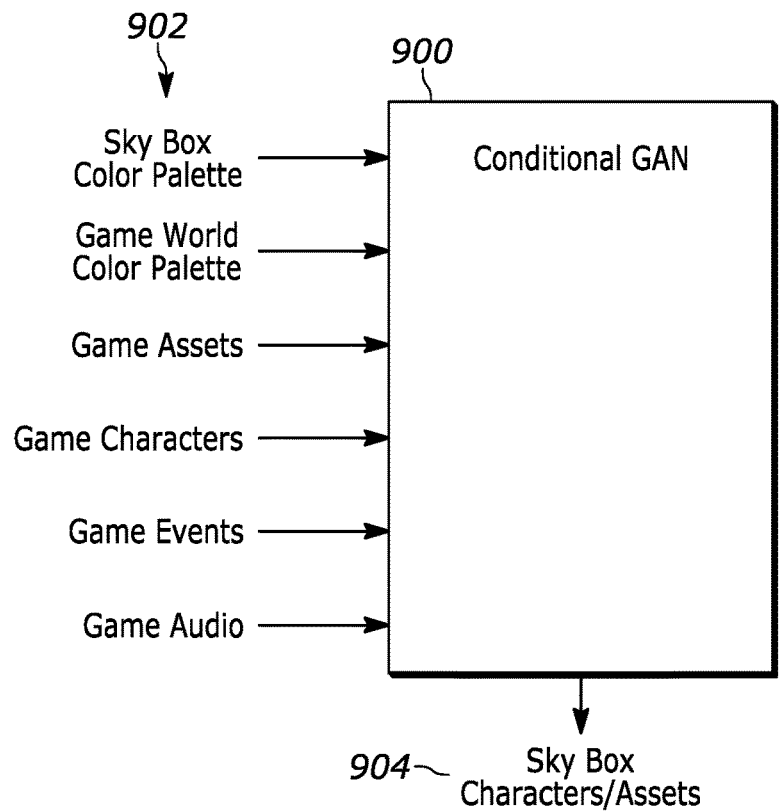
FIG. 9 illustrates an example GAN for generating sky box characters and assets.

FIGS. 9-12 illustrate further details related to animating and remastering computer simulation sky boxes. FIG. 9 illustrates an ML model 900 such as a conditional GAN that may be trained to receive various inputs 902 and generate an output 904 that is sky box characters and assets. The ML model 900 thus may be similar to GAN A in FIG. 8.

The inputs 902 may include sky box color palette, game world color palette, existing in-game assets, existing in-game characters, in-game events, and in-game audio. Existing game characters/assets optionally may be re-used. The output 904 includes resized characters/assets based on 3D sky box scale.

Figure 10:
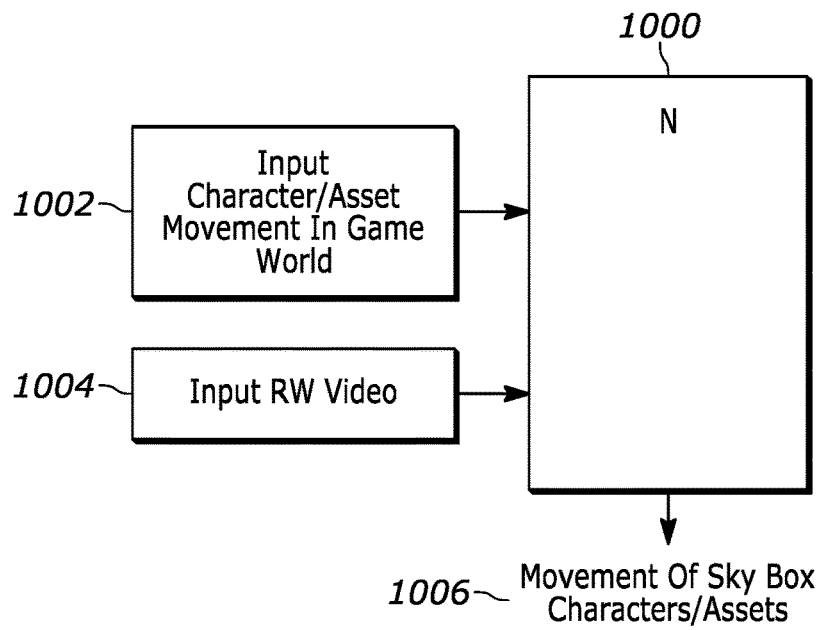
FIG. 10 illustrates an example neural network for generating motion of sky box characters/assets.

FIG. 10 illustrates an optional ML engine 1000 such as a neural network that is trained for dynamic task generation based on input including similar character/asset in-game actions/movements 1002 and/or real-world example video 1004. The output 1006 includes movements of characters and assets in the sky box.

In implementing FIG. 10, inverse reinforcement learning (RL) may be used to recover a reward function for a task, and then RL can be used to train an agent to perform the task. Imitation learning can be used to train an agent to perform a task by imitating an expert example. Developers may be allowed to specify scripted tasks.

Figure 11:
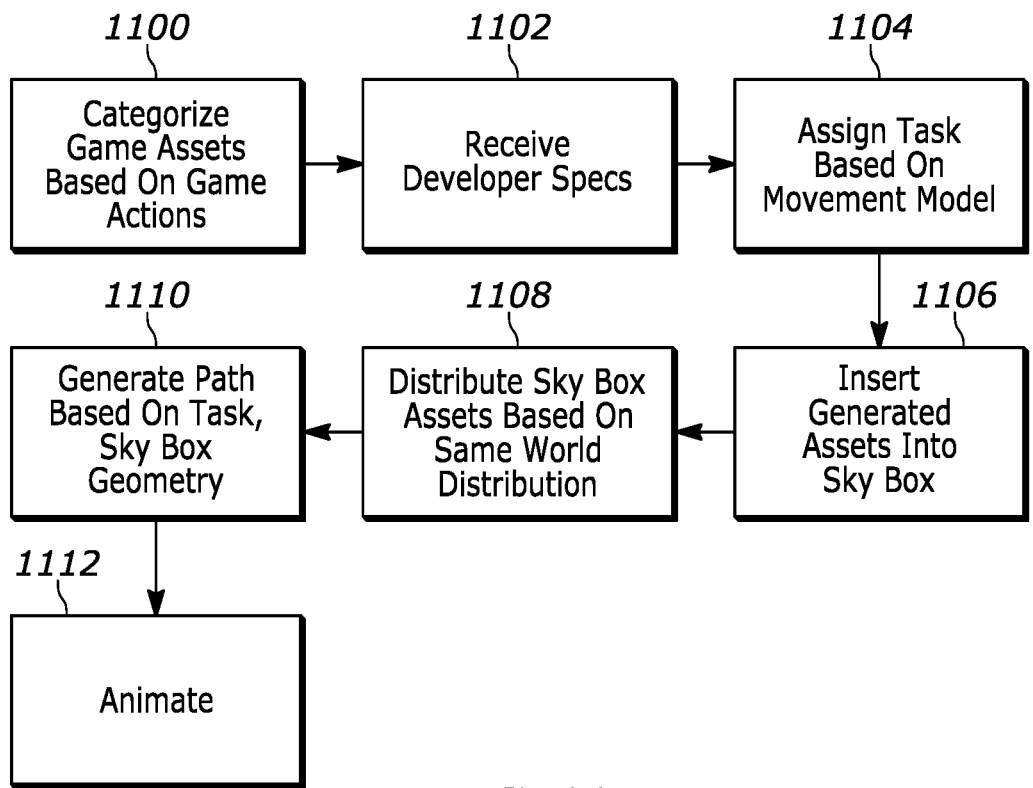
FIG. 11 illustrates example logic in example flow chart format for remastering a sky box.

FIG. 11 illustrates aspects of dynamic task assignment. At block 1100 unsupervised learning may be used to categorize in-game assets based on in-game actions (match actions to task). Moving to block 1102, game developer specifications are received to specify per character/asset type. Block 1104 indicate that a task can be assigned based on a movement model (flying, walking, etc.) Example tasks include patrolling an area, mining resources, guarding, entering, and exiting a world while traveling, etc.

Moving to block 1106, the generated assets are inserted into the 3D generated sky box. Proceeding to block 1108, characters/assets are distributed through the sky box by analyzing a distribution of character/assets in the associated game world. Dynamic path generation is executed at block 1110 based on the assigned task and 3D geometry of the sky box. Block 1102 indicates that sky box characters/assets are animated based on the tasks/actions of earlier blocks in FIG. 11.

Figure 12:
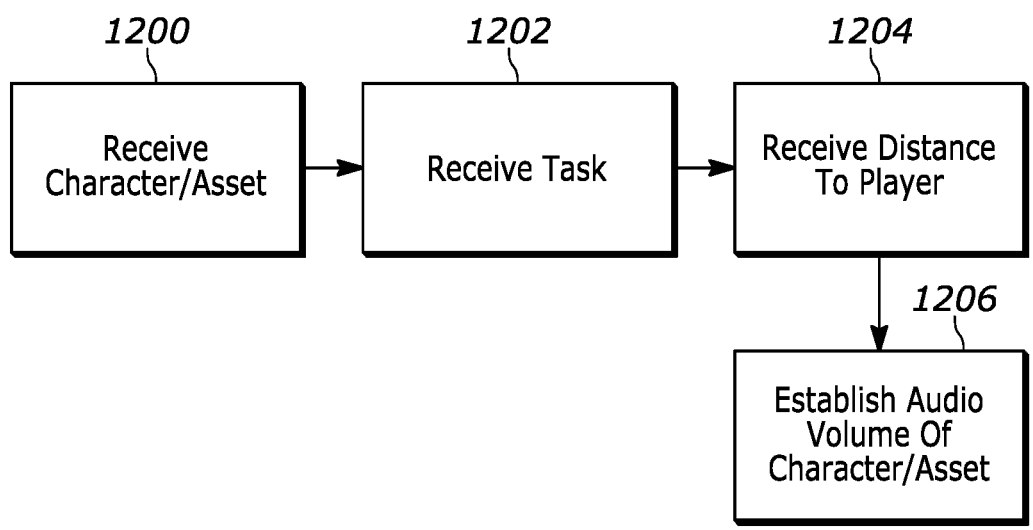
FIG. 12 illustrates example logic in example flow chart format for establishing audio in a sky box.

FIG. 12 illustrates principles of dynamic audio generation based on receiving, at block 1200, characters/assets inserted into the sky box, tasks of those assets (block 1202), and distance from each character/asset in the sky box to the virtual location of the player. Audio for each sky box character/asset is established at block 1206 (including volume) based on the inputs received at blocks 1200-1204.

Assets and characters can be dynamically generated for the sky box and removed from the sky box based on their movement through the 3D sky box, completing their actions or tasks, and player virtual location relative to the sky box.

It will be appreciated that whilst present principals have been described with reference to some example embodiments, these are not intended to be limiting, and that various alternative arrangements may be used to implement the subject matter claimed herein.

What is claimed is:

1. A method, comprising:
    identifying at least one sky box in a computer simulation comprising at least the sky box and a game world, the computer simulation not permitting simulation characters from entering the sky box; and
    remastering the sky box with augmented visuals or augmented audio or both augmented visuals and augmented audio.

2. The method of claim 1, wherein the remastering comprises augmenting the sky box at least in part based on at least one image on the game world.

3. The method of claim 1, wherein the remastering comprises augmenting the sky box at least in part based on action in the game world.

4. The method of claim 1, wherein the remastering comprises augmenting the sky box at least in part based on community activity associated with the computer simulation.

5. The method of claim 1, comprising remastering the sky box at least in part using at least one neural network.

6. The method of claim 1, wherein augmenting the sky box comprises changing at least one object in the skybox.

7. The method of claim 1, wherein augmenting the sky box comprises changing at least one color in the sky box.

8. The method of claim 1, wherein augmenting the sky box comprises changing at least one texture in the sky box.

9. The method of claim 1, wherein augmenting the sky box comprises changing at least one audio associated with the sky box.

10. A device comprising:
at least one computer storage that is not a transitory signal and that comprises instructions executable by at least one processor to:
identify at least one feature in a game world of a computer simulation; and
execute at least one neural network to generate at least one feature of a sky box of the computer simulation based at least in part on the feature in the game world.

11. The device of claim 10, comprising the at least one processor, wherein the computer simulation does not permit simulation characters controlled by a simulation controller to enter the sky box.

12. The device of claim 10, wherein the at least one feature of the sky box comprises meta-messaging generated on the fly as the computer simulation is executed and presented in the sky box.

13. The device of claim 10, wherein the at least one feature in the game world comprises a death of a character, and the at least one feature of the sky box comprises a brightness of at least one object in the sky box.

14. The device of claim 10, wherein the at least one feature in the game world comprises a feature from a level in the simulation other than a level at which a player is playing the simulation.

15. The device of claim 10, wherein the at least one feature of the sky box comprises meta-messaging.

16. The device of claim 10, wherein the at least one feature in the game world comprises community activity of spectators of the computer simulation.

17. An assembly, comprising:
at least one processor programmed with instructions to:
identify information from at least a first computer simulation or a first level of a second computer simulation; and
based at least in part on the information, alter at least one feature of a skybox in a second level of the second computer simulation.

18. The assembly of claim 17, wherein the instructions are executable to:
identify information from the first computer simulation; and
based at least in part on the information from the first computer simulation, alter the at least one feature of a skybox in the second level of the second computer simulation.

19. The assembly of claim 17, wherein the instructions are executable to:
identify information from the first level of the second computer simulation; and
based at least in part on the information from the first computer simulation, alter the at least one feature of a skybox in the second level of the second computer simulation.

20. The assembly of claim 17, comprising at least one simulation controller inputting signals to the processor for controlling the second computer simulation.

* * * * *